Oct. 17, 1933.                LE ROY I. DICK                1,930,790
LATCHING MECHANISM
Filed Nov. 25, 1931
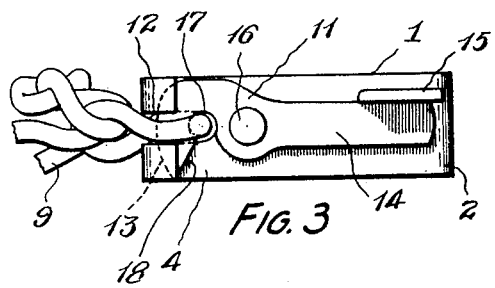
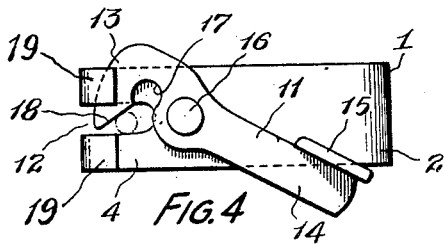
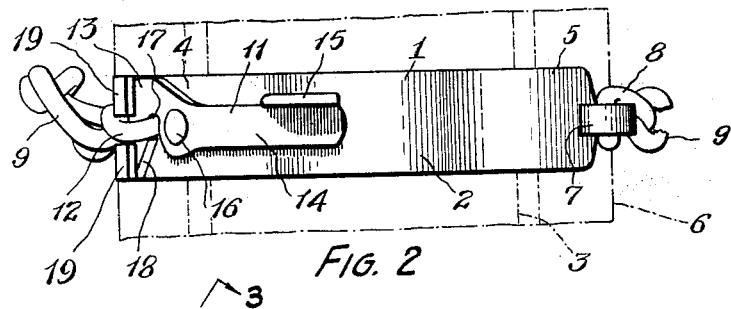
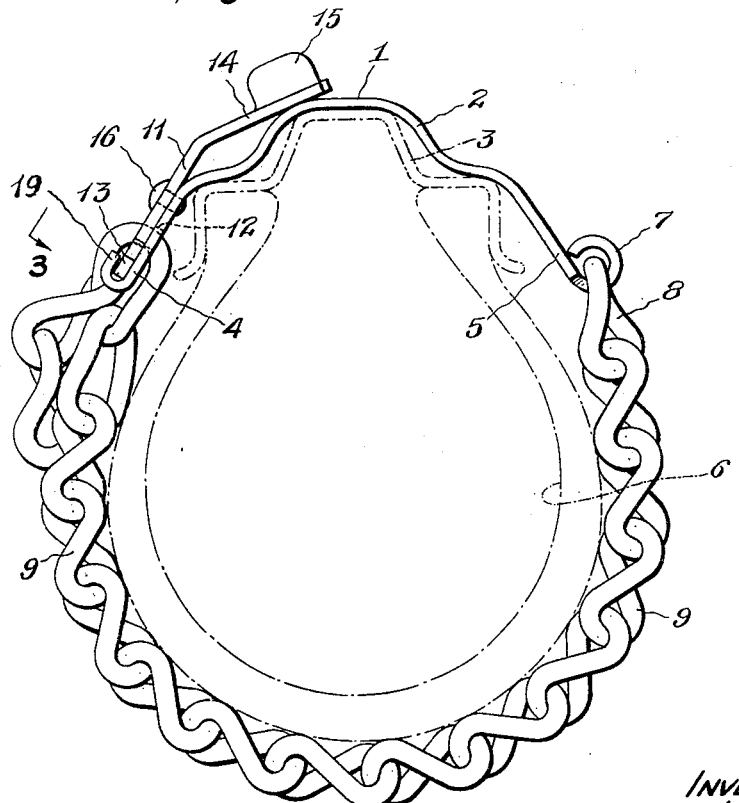
INVENTOR:
LE ROY I. DICK
BY Saywell & Wessler,
ATTORNEYS Patented Oct. 17, 1933

1,930,790

UNITED STATES PATENT OFFICE 1,930,790

LATCHING MECHANISM

LeRoy I. Dick, Cleveland, Ohio, assignor to The Cleveland Chain & Manufacturing Company, Garfield Heights, Ohio, a corporation of Ohio Application November 25, 1931
Serial No. 577,301

3 Claims. (Cl. 14—68)

This invention as indicated relates to latching mechanism particularly to mechanism for application to an emergency chain construction. More particularly, it comprises a device adapted to secure a chain applied around an automobile tire between the spokes of a wheel and held in proper operative relation to the tire surface so that adequate traction may be provided under special circumstances. It includes an improved latch mechanism for engaging any selected link of a length of chain and is particularly adapted to engage a twisted chain link such as is used for tire chains and the like.

Emergency chains for use upon motor vehicles where slippery surfaces or heavy grades are involved or where deep sand or mud holes have to be traversed have frequently been applied to the wheels of motor vehicles but in many instances such constructions have not maintained the chain in proper position across the tread of the tire or have been too expensive to manufacture, or have been difficult to apply and detach. Such constructions likewise have frequently required links of particular size or shape and have not been adapted for use with standard tire chains having twisted links throughout.

The present invention is intended to obviate the difficulties heretofore had with emergency chains and to provide a simplified construction wherein a standard cross chain with twisted links may be used in connection with a supporting plate formed of a strap of sheet metal and engaged therewith permanently at one end and held detachably by an improved latch member at the opposite end.

The invention contemplates the provision of a latch member for the free end of the chain which will be freely engageable therewith in connection with any selected link thereof and which will hold the same securely under all conditions of service.

Another object of the invention is to provide a latch member upon the supporting section of the device which is self-latching when placed in engaged position and which will coact with a slotted supporting plate to provide a rigid fastening for the free end of the chain.

Another object of the invention is to provide a pivoted latch member at one end of the plate which will engage a chain link and in the course of moving the same to latching position will draw the same against the tire, thus providing a slight take-up for any undue slack in the chain.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain structure embodying the invention, such disclosed means constituting, however, but one of various structural forms in which the principle of the invention may be used.

In said annexed drawing:

Figure 1 is a side elevation showing an emergency chain construction embodying the principles of the invention and as applied in operative position around a tire and its supporting members;

Figure 2 is a plan view in enlarged detail, showing the supporting plate and latch mechanism;

Figure 3 is a fragmentary view of the plate and latch mechanism shown in Fig. 1 as seen from a position indicated by the line 3—3 looking in the direction of the arrows; and Figure 4 is a view similar to Fig. 3, but showing the latch in partially closed position.

As is clearly shown in the drawing, a supporting plate 1 is provided comprising a strap of sheet metal formed centrally with an upwardly curved portion 2 of a size to engage over the felly 3 of a wheel and having its ends 4, 5, supported angularly below such bent portion so as to space the same slightly from the sides of a tire 6 engaged upon said wheel. At one end of the strap the metal is cut away at each side and the central portion bent outwardly upon itself so as to form an eye 7 within which is permanently secured the terminal link of a section of cross chain 9. The cross chain is preferably formed throughout its length of twisted links of conventional construction and is made of a length sufficient to extend around the tread of a tire and back to a position to be engaged with the opposite end of such supporting plate. A slight excess of chain length may be provided so that a single device may be used on several different tire sizes.

The means for holding the chain section in connection with the free end of the supporting plate comprises a latch member in the shape of a pivoted hook 11, cooperating with a slot 12 in the free end of the plate. Said latch member is preferably formed of a portion of sheet metal shaped to provide an angular end or hook 11 at its lower end, an enlarged intermediate portion for the pivot, and, disposed at an angle of less than 180° to the body of the latch member, is an operating extension or arm 14 at its upper end provided with an upstanding ear 15 adjacent one side to serve as a finger rest. The latch member at a point spaced from its lower end is provided with a pivot pin 16 which is mounted on a flat section of the supporting plate spaced from the end thereof. The extension arm, as will be clearly seen in Figure 1, is formed by bending the latch member at a point approximately centrally of the length thereof so as to have said arm rest against the upper surface of the supporting plate at a point where it engages over the felly. By constructing the latch member so that it will ride into a central position with light friction on the central portion of the plate, the movement of the lach to either side thereof will necessarily bring the same into greater frictional contact with the marginal portions of the plate and thus the device will be maintained normally in a central position unless positively forced to unlatching position.

The hook portion of the latch is formed by providing a lateral recess in the latch section adjacent the angular end which terminates in a central opening 17, in alignment with the pivot pin, of more than semi-circular extent and the latch member is formed with a beveled point 18 extending from said opening to one corner of the lower end of said latch member, thus a hook having a sharp point at its lower end is provided, such point serving to engage within a chain link and cause the same to ride over its beveled surface and be drawn upwardly to a seated position within said opening. In order to produce such take-up action, the hook member cooperates with the slot 12 formed in the free end of the supporting plate which preferably extends from its lower edge to a point spaced slightly from the pivot pin of the latch. The slot is of a width to freely receive a twisted chain link and position the same at a point where it may be readily engaged by the hook and drawn to operative position. The ends of the supporting plate on opposite sides of the slot are turned upwardly and backwardly upon themselves so as to provide overlying guide members 19 spaced from the slotted portion of the plate a distance sufficient to receive within the same the lower portion of the hook member. These guide members thus serve as a guide for the latch member as well as positioning means for the chain link to be engaged therewith.

When the device is applied to a wheel it is engaged about the tire with the latch end of the plate preferably on the outer side to permit easy access and the chain is then drawn tight about the tire and with the latch turned to open position, the chain link nearest the slot is engaged therein. The finger rest on the latch arm is then pressed so as to force the latch arm over the margin of the plate and into a central position. It will remain in this position because of the resistance to displacement offered by the marginal portions of the curved portion of the plate. As the beveled point of the hook moves against the inner surface of a link it will draw the chain toward the plate with a slight take-up action and provide the proper running adjustment of the emergency chain. The excess links, if any, will in no way interfere with the latch or tend to detach the same. The link engaged in the slot and between overlying guide members has very little side play and will not produce destructive wear on the parts.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. An apparatus of the character described having in combination a plate having curved portions to adapt the same to engage over the felly of a wheel of an automobile, means at one end of said plate providing a permanent support for one end of a length of chain, a slot formed at the opposite end of said plate and extending longitudinally inwardly of the length thereof a short distance, a pivot pin mounted on said plate adjacent the inner end of said slot, a latch member pivotally engaged on said pin and having a hook-shaped terminal member adapted to move across the lower portion of said slot, an operating arm on said latch member disposed at an angle of less than 180° to the body of the latch member so as to ride over an adjacent curved portion of said plate and to be held against displacement from a central position by reason of the greater frictional contact with said plate upon movement of said latch member in either direction.

2. An apparatus of the character described having in combination a plate adapted to engage over the felly of a wheel of an automobile, means at one end of said plate providing a permanent support for one end of a length of chain, a slot formed at the opposite end of said plate and extending longitudinally inwardly of the length thereof a short distance, a latch member pivotally supported on said plate adjacent said slot and comprising an operating arm and a hook-shaped terminal member adapted to cooperate with said slot in engaging a link adjacent the free end of said chain, and said operating arm being formed by bending the latch member intermediate the length thereof, so as to hold the operating arm in light contact with said plate and to frictionally engage said plate and hold said hook-shaped terminal in locking engagement with said link, and a finger piece formed adjacent the end of said operating arm for moving said hook-shaped terminal member into latching and unlatching position.

3. An apparatus of the character described having in combination a plate adapted to engage over the felly of a wheel of an automobile, means at one end of said plate providing a permanent support for one end of a length of chain, a slot formed at the opposite end of said plate and extending longitudinally inwardly of the length thereof a short distance, a pair of reversely turned hook-like guide members on opposite sides of said slot formed at the end of said plate and spaced therefrom, a latch member in the form of a lever formed of a sheet metal strip movably mounted on said plate adjacent said slot and having an extension portion having a hook-shaped end adapted to move across the lower end of said slot within the space formed by said guide members and to engage a link adjacent the free end of said chain inserted in said slot, when said lever is moved into a position overlying said supporting plate.

LeROY I. DICK.